United States Patent
Nakamura et al.

(10) Patent No.: US 12,260,184 B2
(45) Date of Patent: Mar. 25, 2025

(54) TRANSLATION DEVICE

(71) Applicant: NTT DOCOMO, INC., Chiyoda-ku (JP)

(72) Inventors: Toshimitsu Nakamura, Chiyoda-ku (JP); Noritaka Okamoto, Chiyoda-ku (JP); Wataru Uchida, Chiyoda-ku (JP); Yoshinori Isoda, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 269 days.

(21) Appl. No.: 17/784,958

(22) PCT Filed: Dec. 11, 2020

(86) PCT No.: PCT/JP2020/046380
§ 371 (c)(1),
(2) Date: Jun. 13, 2022

(87) PCT Pub. No.: WO2021/125101
PCT Pub. Date: Jun. 24, 2021

(65) Prior Publication Data
US 2023/0009949 A1   Jan. 12, 2023

(30) Foreign Application Priority Data

Dec. 17, 2019   (JP) .................. 2019-227430

(51) Int. Cl.
*G06F 40/47* (2020.01)
*G06F 40/51* (2020.01)

(52) U.S. Cl.
CPC .............. *G06F 40/47* (2020.01); *G06F 40/51* (2020.01)

(58) Field of Classification Search
CPC ........ G06F 40/47; G06F 40/51; G06F 40/253; G06F 40/289; G06F 40/44; G06N 3/0455; G06N 3/09
See application file for complete search history.

(56) References Cited

U.S. PATENT DOCUMENTS

| 11,734,521 B2 * | 8/2023 | Jiang ..................... G06F 40/263 704/8 |
| 2013/0144597 A1 * | 6/2013 | Waibel .................... G10L 15/18 704/2 |

(Continued)

FOREIGN PATENT DOCUMENTS

JP    2019-153023 A1    9/2019

OTHER PUBLICATIONS

Tu et al. (Tu, Zhaopeng, et al. "Neural machine translation with reconstruction." Proceedings of the AAAI Conference on Artificial Intelligence. vol. 31. No. 1. 2017. https://arxiv.org/pdf/1611.01874 (Year: 2017).*

(Continued)

*Primary Examiner* — Pierre Louis Desir
*Assistant Examiner* — Keisha Y. Castillo-Torres
(74) *Attorney, Agent, or Firm* — Oblon, McClelland, Maier & Neustadt, L.L.P.

(57) ABSTRACT

A translation device includes a storage unit configured to store a plurality of pieces of learning data, a normalized sentence learning unit configured to perform learning on the plurality of pieces of learning data by combining original text for learning and a corresponding normalized sentence for learning, a translated sentence learning unit configured to perform learning on the plurality of pieces of learning data by combining the original text for learning and a corresponding translated sentence for learning, and a model generation unit configured to generate one normalization/translation model on the basis of a result of learning by the (Continued)

normalized sentence learning unit and the translated sentence learning unit, in which, on at least a part of the learning data, the translated sentence learning unit performs learning after the normalized sentence learning unit performs learning.

5 Claims, 10 Drawing Sheets

(56) References Cited

U.S. PATENT DOCUMENTS

| | | | |
|---|---|---|---|
| 2017/0139905 A1* | 5/2017 | Na | G06N 3/084 |
| 2019/0205372 A1* | 7/2019 | Li | G06F 40/232 |
| 2022/0245363 A1* | 8/2022 | Nakamura | G06F 40/45 |
| 2022/0318571 A1* | 10/2022 | Ikeda | G06F 40/232 |

OTHER PUBLICATIONS

International Preliminary Report on Patentability and Written Opinion issued Jun. 30, 2022, in PCT/JP2020/046380, 5 pages.
International Search Report issued Mar. 16, 2021, in PCT/JP2020/046380 filed Dec. 11, 2020, 2 pages.
Notice of Reasons for Refusal dated Dec. 10, 2024, issued in corresponding Japanese patent application No. 2021-565556 (with English translation).

* cited by examiner

Fig.2
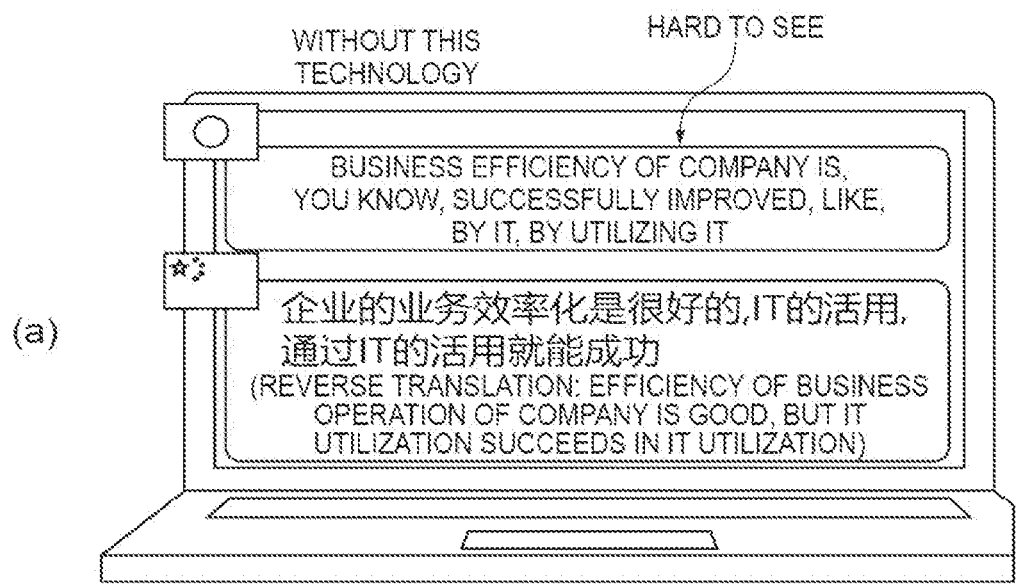
(a)
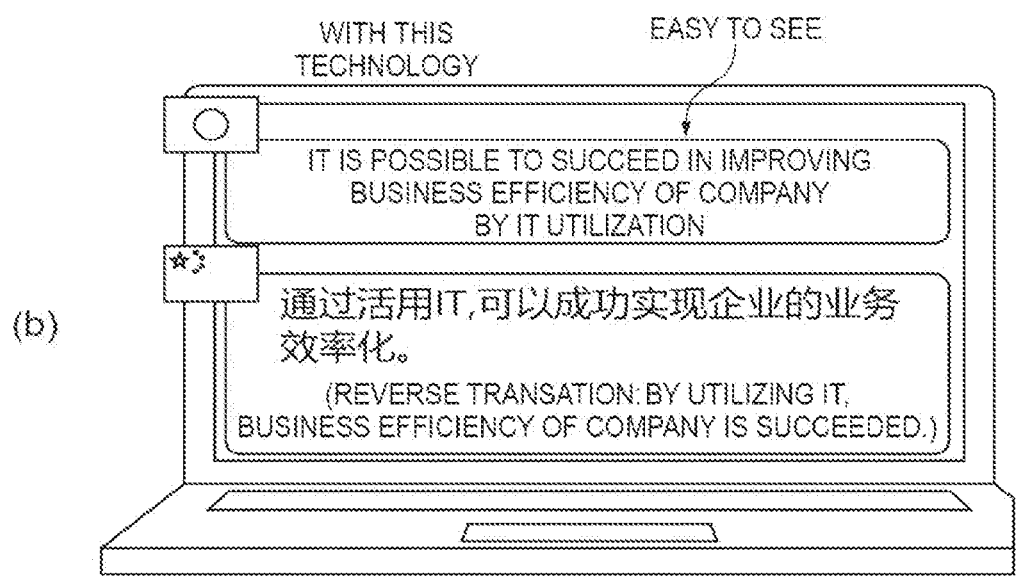
(b)

TRANSLATION DEVICE

TECHNICAL FIELD

An aspect of the present invention relates to a translation device.

BACKGROUND ART

Conventionally, a technology of improving translation accuracy of a translation device by learning a translated sentence for an input sentence (for example, a natural utterance) is known (for example, refer to Patent Literature 1).

CITATION LIST

Patent Literature

[Patent Literature 1] Japanese Unexamined Patent Publication No. 2019-153023

SUMMARY OF INVENTION

Technical Problem

Here, for translation between languages that do not have corpora of a sufficient amount (for example, between Japanese and Chinese, or the like), there is a problem that it is not possible to accurately translate sentences (natural utterances) containing noise such as fillers and rephrasing. With respect to such a problem, it is conceivable to remove the noise from a natural utterance by using, for example, a normalization model (a model that grammatically correctly converts a natural utterance), and then perform translation by using a translation model.

However, when a plurality of independent models are used as described above, a calculation cost increases both at the time of model generation (at the time of learning) and at the time of model use (at the time of translation), and processing takes time. In addition, since they are separate models, a synergistic effect of each model is small, and the translation accuracy cannot be sufficiently improved.

One aspect of the present invention has been made in view of the circumstances described above, and an object thereof is to improve a processing speed and accuracy of translation.

Solution to Problem

A translation device according to one aspect of the present invention includes a storage unit configured to store a plurality of pieces of learning data in which original text for learning of a first language, a normalized sentence for learning that is a grammatically correct conversion of the original text for learning, and a translated sentence for learning that is a translation of the original text for learning into a second language different from the first language are associated with each other, a normalized sentence learning unit configured to perform learning on the plurality of pieces of learning data by combining the original text for learning and the corresponding normalized sentence for learning, a translated sentence learning unit configured to perform learning on the plurality of pieces of learning data by combining the original text for learning and the corresponding translated sentence for learning, and a model generation unit configured to generate one normalization/translation model, which is configured to be able to output a normalized sentence of an input sentence of the first language and a translated sentence thereof into the second language on the basis of a result of learning by the normalized sentence learning unit and the translated sentence learning unit, in which, on at least a part of the learning data, the translated sentence learning unit performs learning after the normalized sentence learning unit performs learning.

In the translation device according to one aspect of the present invention, for a plurality of pieces of learning data, a combination of original text for learning and a corresponding normalized sentence for learning is learned and a combination of the original text for learning and a corresponding translated sentence for learning is learned. Then, one normalization/translation model is generated, which outputs a normalized sentence and a translated sentence into the second language from an input sentence of the first language. In this manner, one common output model (the normalization/translation model) is generated based on a result of learning normalization and translation, and thereby it is possible to shorten a period required for model generation (a total period required for learning and model generation) and to improve an output speed of the normalized sentence and the translated sentence as compared to a case in which each output model is individually generated. Furthermore, in the translation device according to one aspect of the present invention, on at least a part of the learning data, the translated sentence learning unit performs learning after the normalized sentence learning unit performs learning first. As a result, for example, when learning is performed using an encoder/decoder model, on at least a part of the learning data, translated sentence learning can be performed with an influence of noise in the original text for learning suppressed using parameters learned in normalization learning (that is, parameters suitable for normalization). Accordingly, translation accuracy in the normalization/translation model can be improved.

Advantageous Effects of Invention

According to one aspect of the present invention, it is possible to improve the processing speed and accuracy of translation.

BRIEF DESCRIPTION OF DRAWINGS

FIG. 2 is a diagram which describes an outline of an effect of the translation device according to the present embodiment.

DESCRIPTION OF EMBODIMENTS

Figure 1:
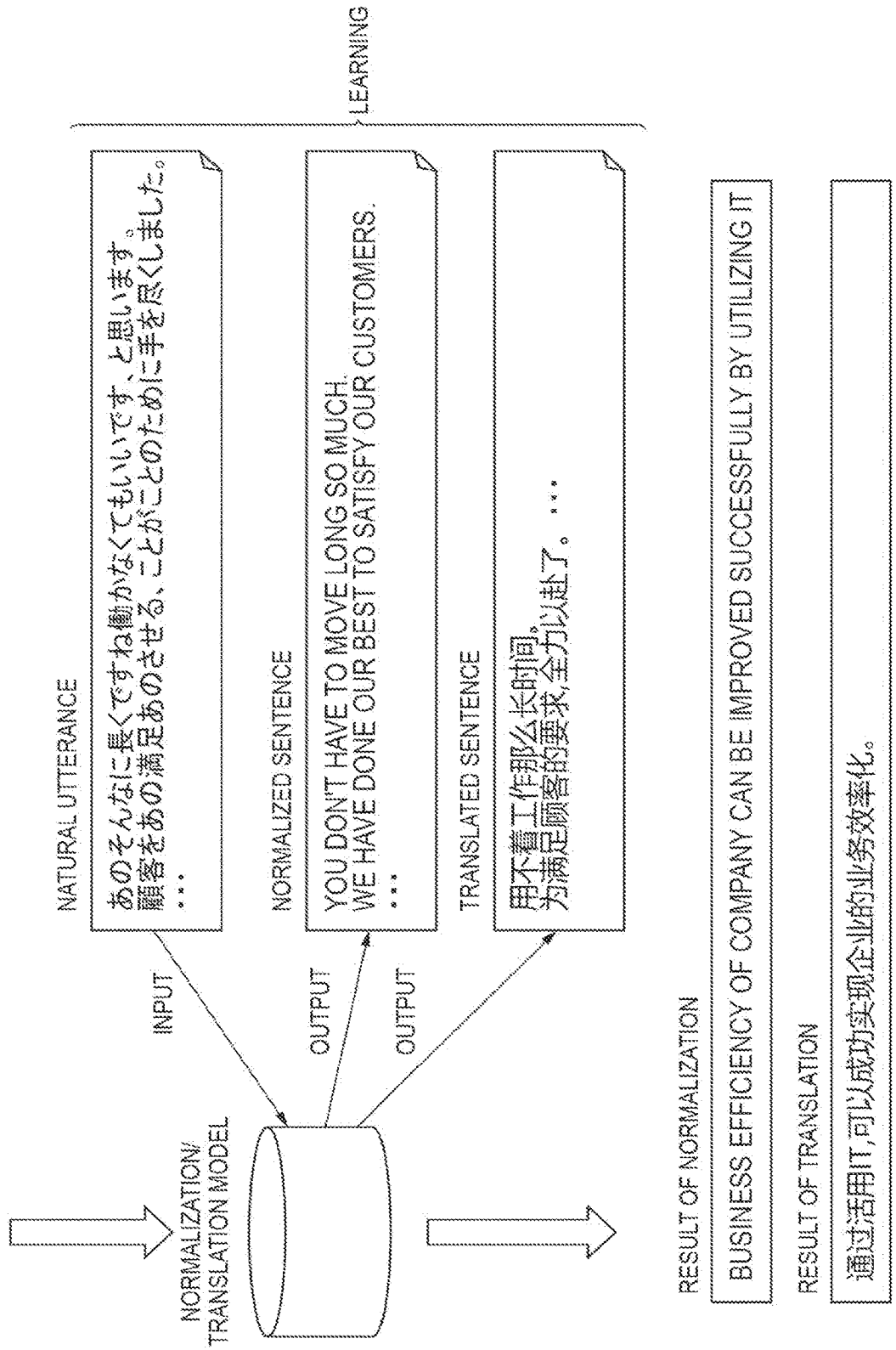
FIG. 1 is a diagram which describes an outline of a normalization/translation model of a translation device according to the present embodiment.

Hereinafter, embodiments of the present invention will be described in detail with reference to the drawings. In the description of the drawings, the same reference numerals will be used for the same or equivalent elements, and duplicate descriptions thereof will be omitted.

First, an outline of a translation device according to the present embodiment will be described with reference to FIGS. 1 and 2. FIG. 1 is a diagram which describes an outline of a normalization/translation model of the translation device according to the present embodiment. As shown in FIG. 1, in the translation device according to the present embodiment, original text of a first language is input to the normalization/translation model, and a normalized sentence (a normalization result) of the first language and a translated sentence (a translation result) of a second language corresponding to the normalization sentence are output from the normalization/translation model. In other words, in an example shown in FIG. 1, original text of a first language, "The business efficiency of a company is, you know, successfully improved, like, by IT, by utilizing IT," is input to the normalization/translation model, and a normalized sentence, "The business efficiency of a company can be improved successfully by utilizing IT" and a translated sentence of a second language are output from the normalization/translation model. The normalized sentence is a sentence of the first language that is a grammatically correct conversion of the input sentence (the original text of the first language). The first language and the second language are different languages from each other. In the example shown in FIG. 1, the first language is Japanese and the second language is Chinese.

As shown in FIG. 1, in the translation device according to the present embodiment, for example, learning data is learned in which original text for learning of the first language that is a natural utterance, a normalized sentence for learning, which is a grammatically correct conversion of the original text for learning, and a translated sentence for learning, which is a translation of the original text for learning into the second language different from the first language are associated with each other. More specifically, in the translation device, normalized sentence learning of performing learning on a plurality of pieces of learning data by combining original text for learning that is an input and a normalized sentence for learning that is a corresponding output, and translated sentence learning of performing learning on the plurality of pieces of learning data by combining the original text for learning that is an input and a translated sentence for learning that is a corresponding output are performed. Then, in the translation device, one normalization/translation model configured to be able to output a normalized sentence of an input sentence of the first language and a translated sentence thereof into the second language is generated based on results of these types of learning. The translated sentence described above is derived using the normalization/translation model generated in this manner.

FIG. 2 is a diagram which describes an outline of an effect of the translation device according to the present embodiment. FIG. 2(*a*) shows an example of a translated sentence when a technology described in the present embodiment (a technology of the translation device according to the present embodiment) is not used, and FIG. 2(*b*) shows an example of a translated sentence when the technology described in the present embodiment (the technique of the translation device according to the present embodiment) is used. In the example shown in FIGS. 2(*a*) and 2(*b*), original text shown in FIG. 1 ("The business efficiency of a company is, you know, successfully improved, like, by IT, by utilizing IT") is input as an input sentence. In the example shown in FIG. 2(*a*), since the normalization/translation model described in the present embodiment is not used, the original text which is an input sentence ("The business efficiency of a company is, you know, successfully improved, like, by IT, by utilizing IT") is translated as it is. The original text is a natural utterance that contains much noise such as fillers and rephrasing. For this reason, if the original text is translated as it is, accurate translation cannot be performed as shown in an inverse conversion of the translated sentence in FIG. 2(*a*). On the other hand, in the example shown in FIG. 2(*b*), the normalization/translation model described in the present embodiment is used, the original text which is an input sentence is normalized, and the noise such as fillers and rephrasing is removed. Then, translation to a second language is performed on the basis of the normalized sentence. As a result, as shown in an inverse translation of the translated sentence in FIG. 2(*b*), it is possible to accurately perform translation on a sentence to be originally translated.

Figure 3:
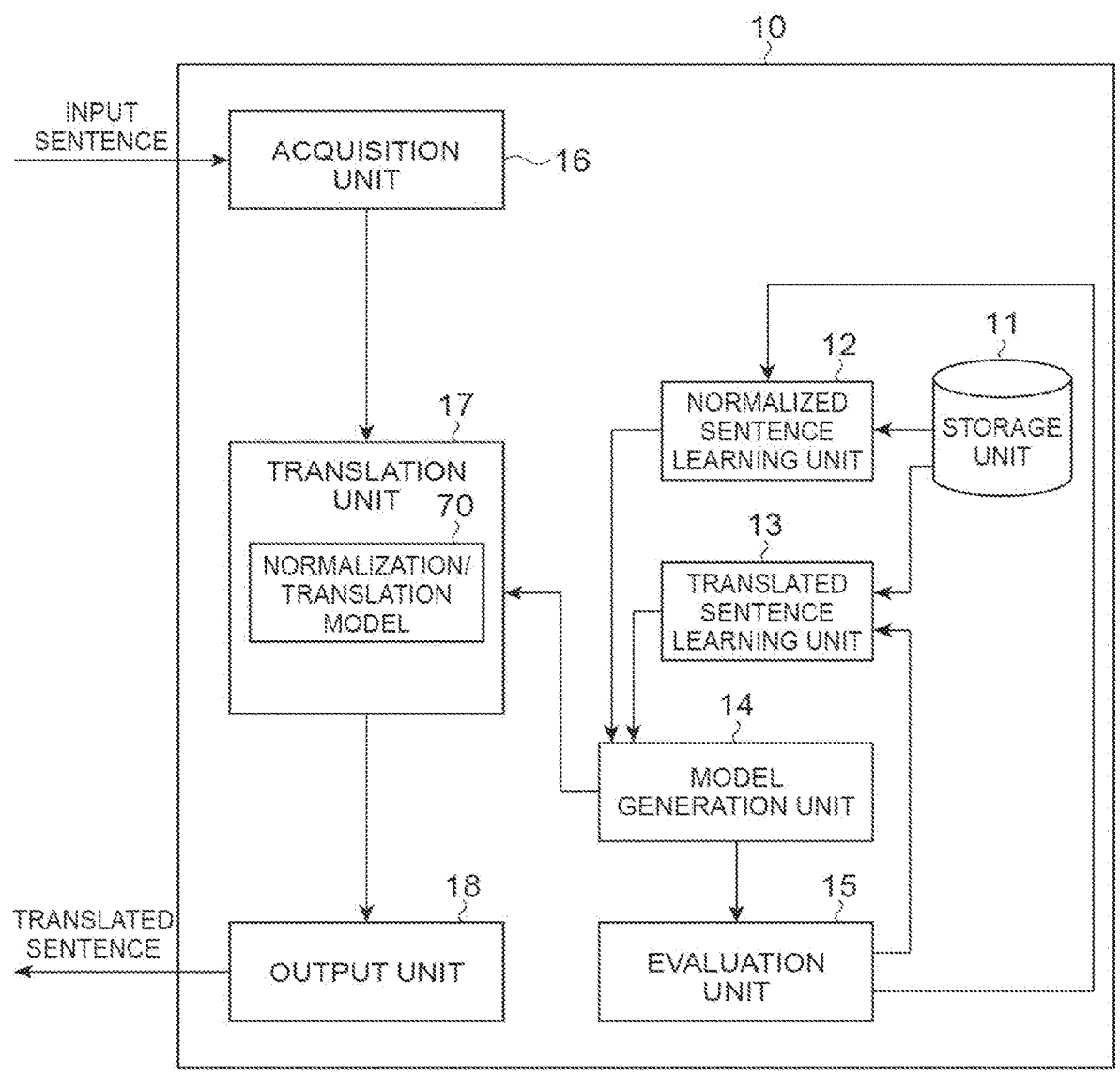
FIG. 3 is a functional block diagram of the translation device according to the present embodiment.

Next, a configuration of the translation device 10 according to the present embodiment will be described with reference to FIG. 3. FIG. 3 is a functional block diagram of the translation device 10 according to the present embodiment. The translation device 10 shown in FIG. 3 is a device that generates a translated sentence of the second language based on the input sentence of the first language to be translated. As described above, the first language is, for example, Japanese, and the second language is, for example, Chinese. The first language and the second language may be languages different from each other, and are not limited to natural languages but may be artificial languages or formal languages (computer programming languages). A sentence is a unit of language expression that is formally completed and unified according to a single statement. The sentence may be interpreted as being formed of one or more sentences (for example, a paragraph, a sentence, or the like).

As shown in FIG. 3, the translation device 10 has a storage unit 11, a normalized sentence learning unit 12, a translated sentence learning unit 13, a model generation unit 14, and an evaluation unit 15 as functions related to learning and generation of a normalization/translation model 70.

A function related to learning of the translation device 10 will be described with reference to FIGS. 4 to 7. The translation device 10 generates one normalization/translation model 70 configured to be able to output a normalized sentence of the input sentence of the first language and a translated sentence thereof into the second language by learning a plurality of pieces of learning data. Such a normalization/translation model 70 is, for example, a mechanical translation model (for example, NMT), and is generated by performing learning using, for example, an encoder/decoder model. The encoder/decoder model is configured from two recursive neural networks called an encoder and a decoder, the encoder converts an input series into an intermediate representation, and the decoder generates an output series from the intermediate representation.

Figure 4:
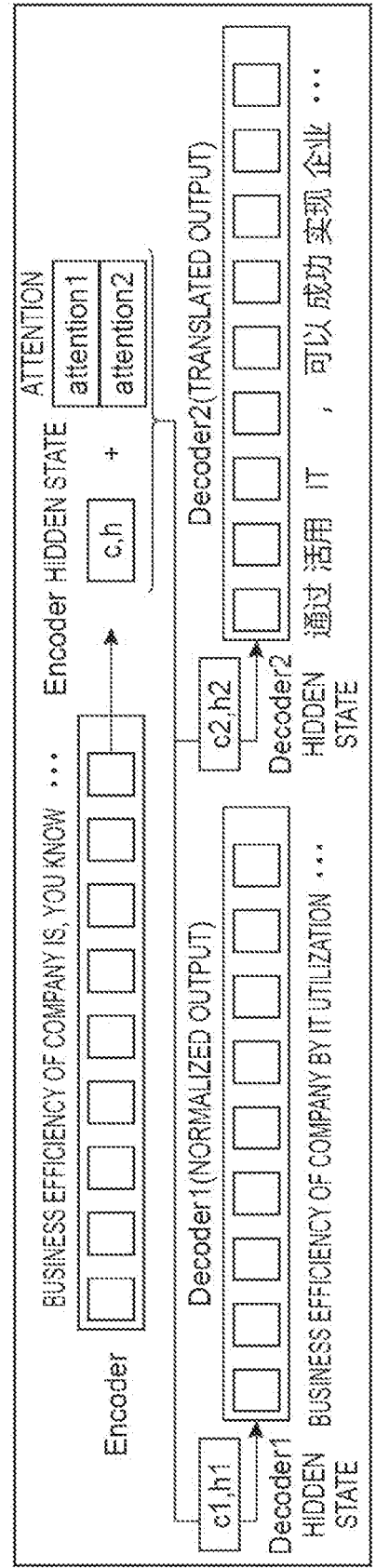
FIG. 4 is a diagram which describes learning related to normalization and translation of the translation device according to the present embodiment.

FIG. 4 is a diagram which describes learning related to normalization and translation of the translation device 10 according to the present embodiment, and is a diagram which describes learning using the encoder/decoder model according to the present embodiment. As shown in FIG. 4, one common encoder for normalization and translation, and a decoder for normalization (Decoder1 in FIG. 4) and a decoder for translation (Decoder2 in FIG. 4) are used in the learning using the encoder/decoder model in the present embodiment. The encoder converts an input sentence, which is a natural utterance, into a fixed-length vector representation. Such a vector representation is an intermediate representation inherited by the decoder. In the encoder/decoder model, an attention function is adopted, and the decoder can decode while referring to a history of a hidden state of the encoder. Note that attention supports the hidden state of the encoder, and has a function of storing, for example, an order of words (positional information of words).

Figure 5:
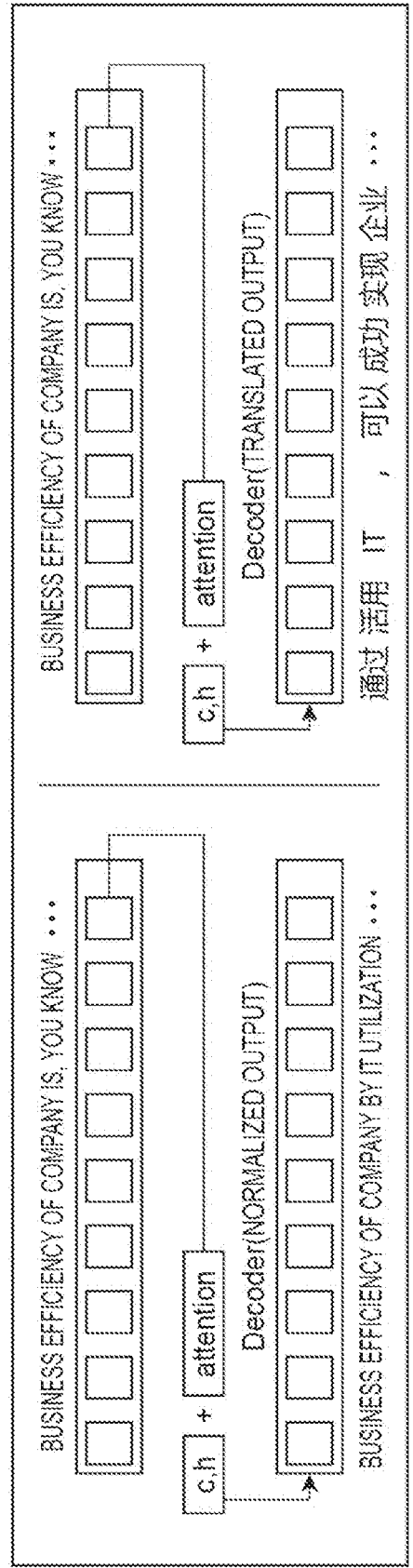
FIG. 5 is a diagram which describes learning related to normalization and translation of a translation device according to a comparative example.

FIG. 5 is a diagram which describes learning related to normalization and translation of a translation device according to a comparative example, and is a diagram which describes learning using an encoder/decoder model according to the comparative example. As shown in FIG. 5, in general, a model related to normalization and a model related to translation are separately (individually) generated, and thus an encoder and a decoder are provided individually even in learning using the encoder/decoder model. As compared to such a case, since the encoder/decoder model according to the present embodiment shown in FIG. 4 uses one common encoder for normalization and translation, it is possible to reduce a calculation cost in learning and to speed up the processing. When the second language is set to be a plurality of languages in the normalization/translation model 70, the number of decoders may be increased according to the number of languages. In this manner, by performing learning using the encoder/decoder model, it is possible to easily cope with a case where the second language is set to be a plurality of languages.

Figure 6:
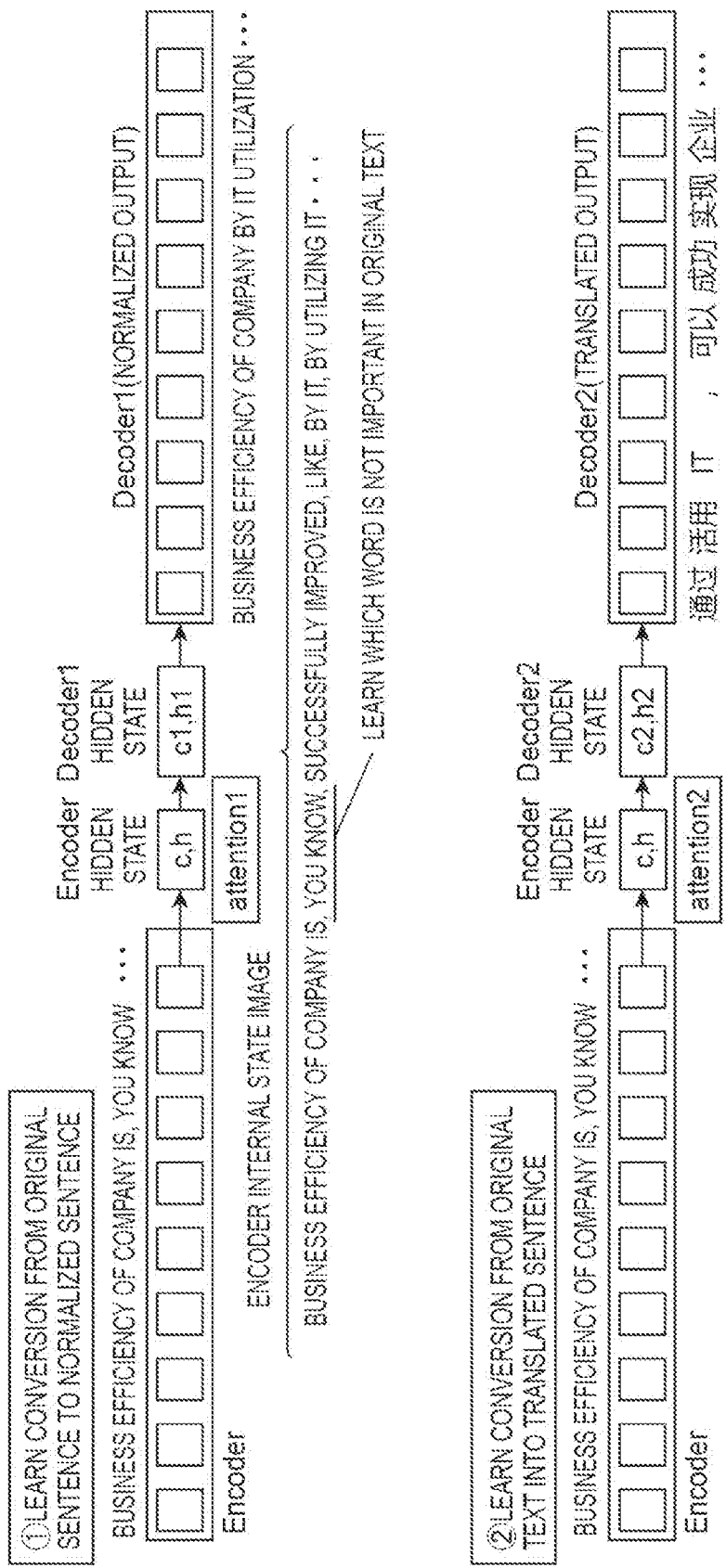
FIG. 6 is a diagram which describes the learning related to the normalization and translation of the translation device according to the present embodiment.

FIG. 6 is a diagram which describes the learning related to the normalization and translation of the translation device 10 according to the present embodiment, and is a diagram which describes learning using the encoder/decoder model according to the present embodiment. As shown in FIG. 6, in the learning using the encoder/decoder model in the present embodiment, after conversion of learning data from original text for learning into a normalized sentence for learning is learned, conversion of the learning data from the original text for learning into a translated sentence for learning is learned. The conversion from the original text for learning into the normalized sentence for learning is learned, and thereby it is learned which words in the original text for learning are not important (which words are noise) and a hidden state of the encoder becomes robust to noise. Then, the conversion from the original text for learning into the translated sentence for learning is learned after the conversion into the normalized sentence for learning is learned, and thereby it is possible to learn the conversion into the translated sentence for learning by maintaining (using) the hidden state of the encoder learned at the time of the conversion into the normalized sentence for learning. In this manner, it is possible to learn the conversion into the translated sentence for learning with the influence of noise suppressed, and to improve translation accuracy.

Figure 7:
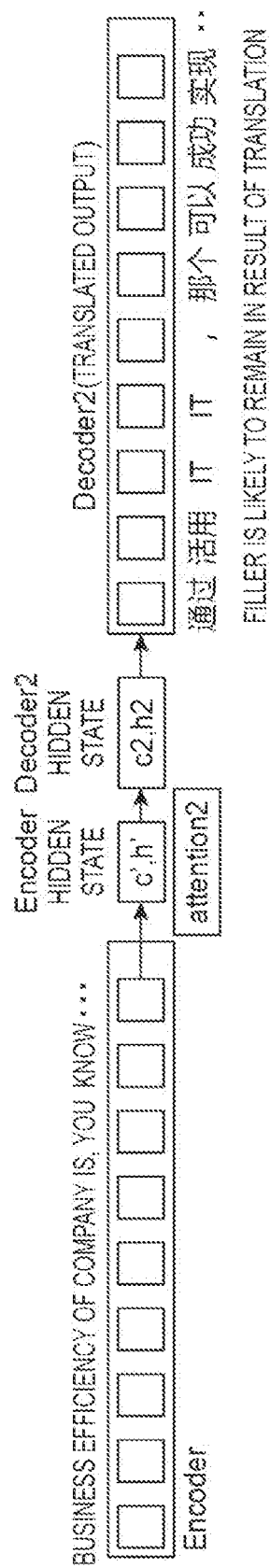
FIG. 7 is a diagram which describes the learning related to the normalization and translation of the translation device according to the comparative example.

FIG. 7 is a diagram which describes learning related to the normalization and translation of the translation device according to the comparative example, and is a diagram which describes learning using the encoder/decoder model according to the comparative example. In the example shown in FIG. 7, unlike an aspect described in FIG. 6, the conversion from the original text for learning into the translated sentence for learning is not learned after the conversion from the original text for learning into the normalized sentence for learning is learned (for example, the conversion into the translated sentence for learning is learned first). In such an aspect, noise such as fillers is likely to remain in a result of translation because the hidden state of the encoder that is robust to noise as described in FIG. 6 cannot be used at the time of learning the conversion into the translated sentence for learning. As compared with such an aspect, as described above, it is possible to learn the conversion into the translated sentence for learning with the influence of noise suppressed, and to improve the translation accuracy in the aspect shown in FIG. 6.

Returning to FIG. 3, the storage unit 11 stores a plurality of pieces of learning data in which original text for learning of the first language, a normalized sentence for learning that is a grammatically correct conversion of the original text for learning, and a translated sentence for learning that is a translation of the original text for learning into the second language different from the first language are associated with each other. Such learning data is a corpus (database of sentences) in which sentences are associated with each other, which is constructed for machine learning.

The normalized sentence learning unit 12 performs learning on the plurality of pieces of learning data by combining original text for learning and a corresponding normalized sentence for learning. That is, the normalized sentence learning unit 12 learns the conversion from the original text for learning to the normalized sentence for learning for each piece of the learning data stored in the storage unit 11. The normalized sentence learning unit 12 learns, for example, which words are not important (which words are noise such as fillers) in the original text for learning. The normalized sentence learning unit 12 and the translated sentence learning unit 13 alternately perform learning. That is, on each piece of the learning data, the translated sentence learning unit 13 performs learning continuously after the normalized sentence learning unit 12 performs learning. In this manner, on at least a part of the learning data, the translated sentence learning unit 13 performs learning after the normalized sentence learning unit 12 performs learning.

The normalized sentence learning unit 12 uses an encoder common to the translated sentence learning unit 13, uses a decoder provided individually (separately from a decoder used by the translated sentence learning unit 13), and uses an encoder/decoder model to perform learning. The normalized sentence learning unit 12 may repeatedly perform learning a plurality of times for each piece of learning data. As described above, the normalized sentence learning unit 12 basically performs learning alternately with the translated sentence learning unit 13, but when the evaluation unit 15 evaluates that a value of a loss function related to normalization is larger than a first threshold value (details will be described below), it may also repeatedly perform learning on each piece of learning data independently, which is separate from the learning alternately performed by itself and the translated sentence learning unit 13. The normalized sentence learning unit 12 outputs a result of the learning to the model generation unit 14.

The translated sentence learning unit 13 performs learning on the plurality of pieces of learning data by combining original text for learning and a corresponding translated sentence for learning That is, the translated sentence learning unit 13 learns the conversion from the original text for learning to the translated sentence for learning for each piece of the learning data stored in the storage unit 11. The translated sentence learning unit 13 performs learning alternately with the normalized sentence learning unit 12. That is, on each piece of the learning data, for example, the translated sentence learning unit 13 performs learning continuously after the normalized sentence learning unit 12 performs learning. In this manner, on at least a part of the learning data, the translated sentence learning unit 13 performs learning after the normalized sentence learning unit 12 performs learning.

The translated sentence learning unit 13 uses the encoder common to the normalized sentence learning unit 12, uses a decoder provided individually (separately from the decoder used by the normalized sentence learning unit 12), and uses an encoder/decoder model to perform learning. The translated sentence learning unit 13 may also perform learning on each piece of the learning data by using the hidden state of the encoder learned by the normalized sentence learning unit 12. The translated sentence learning unit 13 may repeatedly perform learning on each piece of learning data a plurality of times. As described above, the translated sentence learning unit 13 basically performs learning alternately with the normalized sentence learning unit 12, but when the evaluation unit 15 evaluates that a value of a loss function related to translation is larger than a second threshold value (details will be described below), it may also repeatedly perform learning on each piece of the learning data independently, which is separate from the learning performed alternately by itself and the normalized sentence learning unit 12. The translated sentence learning unit 13 outputs a result of the learning to the model generation unit 14.

The model generation unit 14 generates one normalization/translation model 70 which is configured to be able to output a normalized sentence of the input sentence of the first language and a translated sentence thereof into a second language on the basis of a result of the learning by the normalized sentence learning unit 12 and the translated sentence learning unit 13. The model generation unit 14 outputs the generated normalization/translation model 70 to the evaluation unit 15 and a translation unit 17.

The evaluation unit 15 derives a loss function related to normalization and a loss function related to translation for the normalization/translation model 70 generated by the model generation unit 14, and evaluates the normalization/translation model 70 based on the value of each loss function. Specifically, the evaluation unit 15 derives a loss function by comparing a softmax output value of each word output on a decoder side with embedding of a correct word. It is common to use softmax cross entropy for the loss function, but other loss functions may also be used. The loss function is a function that represents a size of a deviation between a predicted value and an actual value, and is a function used when prediction accuracy of the model is evaluated. It can be said that the model becomes more accurate as the value of the loss function decreases. That is, for the normalization/translation model 70, accuracy of normalization becomes higher as the value of the loss function related to normalization decreases, and accuracy of translation becomes higher as the value of the loss function related to translation decreases.

When the normalized sentence learning unit 12 and the translated sentence learning unit repeatedly perform learning on the plurality of pieces of learning data a plurality of times, the evaluation unit 15 evaluates that the normalization/translation model 70 is in a first state with low prediction accuracy when at least one of the value of the loss function related to normalization being larger than a predetermined first threshold value and the value of the loss function related to translation being larger than a predetermined second threshold value is satisfied. Then, when the evaluation unit 15 evaluates that the normalization/translation model 70 is in the first state with low prediction accuracy, and the value of the loss function related to normalization is larger than the first threshold value, the normalized sentence learning unit 12 repeatedly performs learning on learning data independently, which is separate from the learning performed alternately by itself and the translated sentence learning unit 13. In addition, when the evaluation unit 15 evaluates that the normalization/translation model 70 is in the first state with low prediction accuracy, and the value of the loss function related to translation is larger than the second threshold value, the translated sentence learning unit 13 repeatedly performs learning on learning data independently, which is separate from the learning performed alternately by itself and the normalized sentence learning unit 12.

As shown in FIG. 3, the translation device 10 includes an acquisition unit 16, the translation unit 17, and an output unit 18 as functions related to translation using the normalization/translation model 70. The functions related to translation are realized on the premise that the normalization/translation model 70 is generated by functions related to the learning and generation of the normalization/translation model 70 described above.

The acquisition unit 16 acquires an input sentence of the first language to be translated. The input sentence may be, for example, a sentence obtained by converting a result of voice recognition of a voice emitted by a user into text. When a result of the voice recognition is used as an input sentence, the input sentence may contain noise such as fillers, rephrasing, and stammering. The input sentence may be, for example, a sentence input by user using an input device such as a keyboard. Even in such a case, the input sentence may contain noise such as input errors. The acquisition unit 16 outputs the input sentence to the translation unit 17.

The translation unit 17 has the normalization/translation model 70 generated by the model generation unit 14. The translation unit 17 generates a normalized sentence of the first language by inputting the input sentence acquired by the acquisition unit 16 to the normalization/translation model 70. Furthermore, the translation unit 17 generates a translated sentence of the second language corresponding to the normalized sentence by inputting the normalized sentence to the normalization/translation model 70. The translation unit 17 outputs the generated normalized sentence and translated sentence to the output unit 18.

The output unit 18 outputs the translated sentence. The output unit 18 may output the normalized sentence along with the translated sentence. For example, when the output unit 18 receives the translated sentence from the translation unit 17, it outputs the translated sentence (and the normalized sentence) to the outside of the translation device 10. The output unit 18 may output the translated sentence (and the normalized sentence) to an output device such as a display and a speaker.

Figure 8:
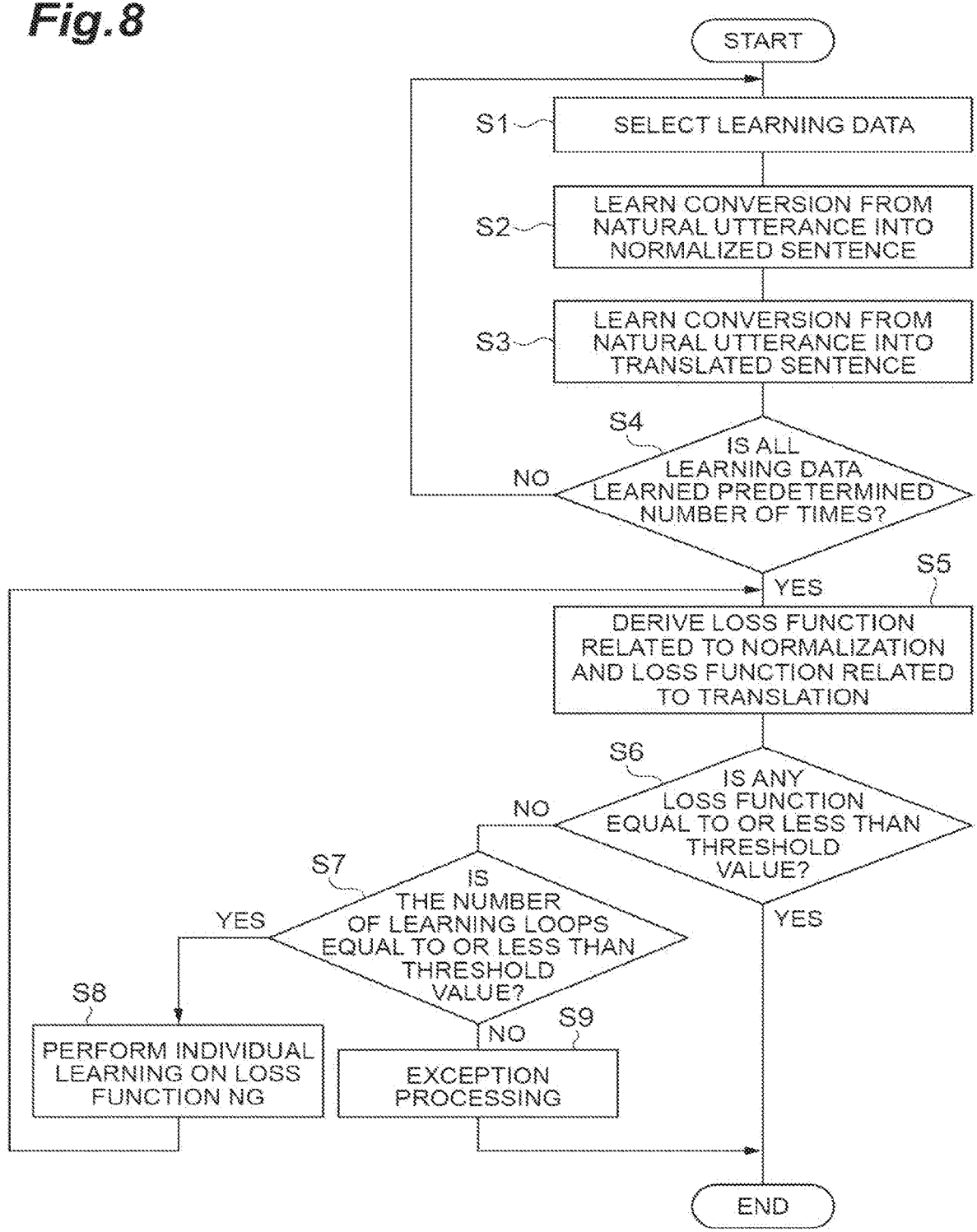
FIG. 8 is a flowchart which shows learning processing of the translation device according to the present embodiment.

Next, learning processing of the translation device 10 will be described with reference to FIG. 8. FIG. 8 is a flowchart which shows the learning process of the translation device 10.

As shown in FIG. 8, in the translation device 10, first, respective sentences of a plurality of pieces of learning data are divided and one piece of learning data is selected (step S1). The learning data is data in which original text for learning of the first language, a normalized sentence for learning that is a grammatically correct conversion of the original text for learning, and a translated sentence for learning that is a translation of the original text for learning into the second language different from the first language are associated with each other. In the following description, the original text for learning is explained as a natural utterance sentence.

Subsequently, the translation device 10 performs learning on the selected one piece of learning data by combining the original text for learning, which is a natural utterance sentence, and the normalized sentence for learning, and learns a conversion from the natural utterance sentence into the normalized sentence (step S2). Next, the translation device 10 performs learning on the same learning data by combining the original text for learning, which is a natural utterance sentence, and the translated sentence for learning, and learns a conversion from the natural utterance sentence into the translated sentence (step S3).

Subsequently, the translation device 10 determines whether all the learning data has been learned a predetermined number of times (the learning related to normalization and translation) (step S4). When it is determined in step S4 that there is learning data that has not been learned a predetermined number of times, the processing is executed from the processing of step S1 again.

On the other hand, when it is determined in step S4 that all the learning data has been learned a predetermined number of times, the translation device 10 generates one normalization/translation model 70 based on a result of the learning, and also derives the loss function related to normalization and the loss function related to translation for the normalization/translation model 70 (step S5).

Subsequently, the translation device 10 determines whether values of the two derived loss functions are equal to or less than a predetermined threshold value (step S6). That is, the translation device 10 determines whether the value of the loss function related to normalization is equal to or less than a predetermined first threshold value and the value of the loss function related to translation is equal to or less than a predetermined second threshold value. When it is determined in step S6 that the value of any loss function is equal to or less than the predetermined threshold value, the learning processing ends as the loss function has converged.

On the other hand, when it is determined in step S6 that the value of at least one of the loss functions is larger than the threshold value, the translation device 10 determines whether the number of learning loops of individual learning to be described below (the number of learning loops including processing of step S8 to be described below) is equal to or less than a predetermined threshold value (step S7).

In step S7, when it is determined that the number of learning loops of individual learning is equal to or less than the predetermined threshold value, the translation device 10 performs individual learning on learning items for which the value of the loss function is determined to be equal to or less than the predetermined threshold value (step S8). Specifically, when the value of the loss function related to normalization is evaluated to be larger than the first threshold value (for example, when the loss function is gradually increasing), the translation device 10 repeatedly performs learning related to normalization on each piece of the learning data independently, which is separate from the learning performed alternately with learning related to translation. Similarly, the translation device 10 performs the learning related to translation on each piece of the learning data independently, which is separate from the learning alternately performed with the learning related to normalization, when the value of the loss function related to translation is evaluated to be larger than the second threshold (for example, when the loss function is gradually increasing). After the individual learning of step S8 is performed, the processing is executed from the processing of step S5 again.

On the other hand, when it is determined in step S7 that the number of learning loops of individual learning (the number of times the processing of step S8 is executed) is more than a predetermined threshold value, the translation device 10 determines that neither of the two loss functions can be made to converge by individual learning, and executes exception processing (step S9). In the exception processing, the translation device 10 performs learning processing such that a sum of the value of the loss function related to normalization and the value of the loss function related to translation is equal to or less than a predetermined threshold value (a third threshold value). When the processing of step S9 is completed, the learning process ends. In this manner, the learning processing ends when the values of the two loss functions are equal to or less than a predetermined threshold value (the loss functions converge), or the sum of the values of the two loss functions is equal to or less than the predetermined threshold value by the exception processing. This is the learning processing.

Figure 9:
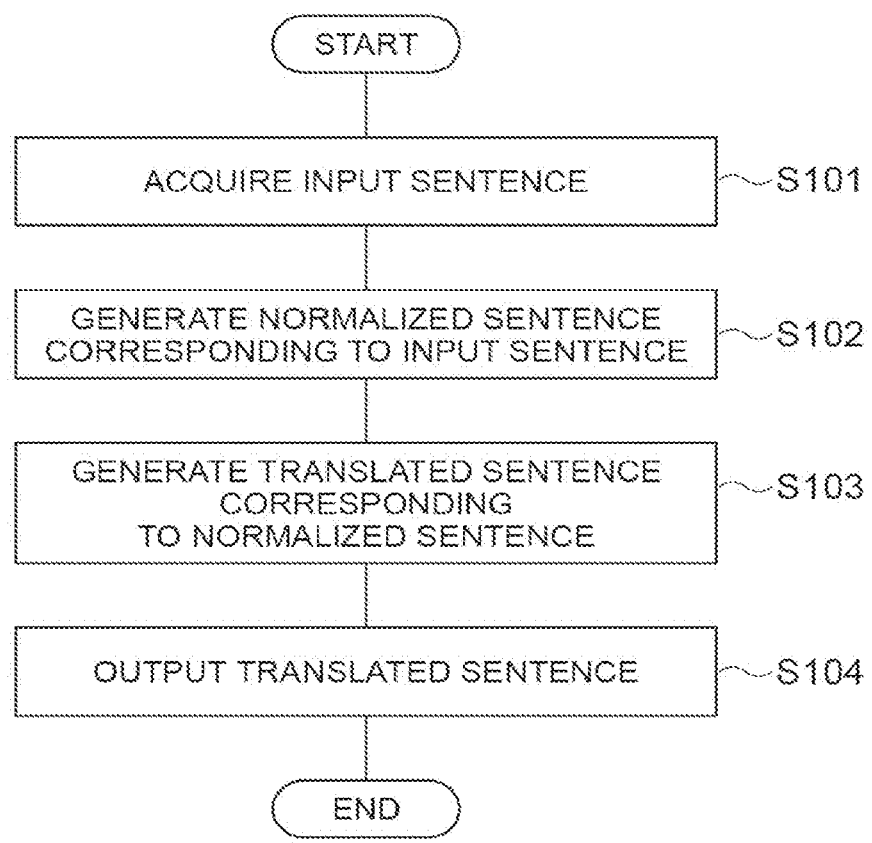
FIG. 9 is a flowchart which shows translation processing of the translation device according to the present embodiment.

Next, translation processing of the translation device 10 will be described with reference to FIG.9. FIG. 9 is a flowchart which shows the translation processing of the translation device 10.

As shown in FIG. 9, in the translation device 10, first, the input sentence of the first language to be translated is acquired (step S101). Subsequently, the translation device 10 generates a normalized sentence of the first language corresponding to the input sentence by inputting the acquired input sentence to the normalization/translation model 70 (step S102).

Subsequently, the translation device 10 generates a translated sentence of the second language corresponding to the normalized sentence by inputting the normalized sentence to the normalization/translation model 70 (step S103). Finally, the translation device 10 outputs the generated translated sentence to the outside (step S104). The translation device 10 may output the normalized sentence together with the translated sentence. The above is translation processing.

Next, effects of the translation device 10 according to the present embodiment will be described.

The translation device 10 according to the present embodiment includes the storage unit 11 that stores a plurality of pieces of learning data in which original text for learning of a first language, a normalized sentence for learning that is a grammatically correct conversion of the original text for learning, and a translated sentence for learning that is a translation of the original text for learning into a second language different from the first language are associated with each other, the normalized sentence learning unit 12 that performs learning on the plurality of pieces of learning data by combining original text for learning and a corresponding normalized sentence for learning, the translated sentence learning unit 13 that performs learning on the plurality of pieces of learning data by combining original text for learning and a corresponding translated sentence for learning, and the model generation unit 14 that generates one normalization/translation model 70, which is configured to be able to output a normalized sentence of an input sentence of the first language and a translated sentence thereof into the second language on the basis of a result of learning by the normalized sentence learning unit 12 and the translated sentence learning unit 13, and, on at least a part of the learning data, the translated sentence learning unit 13 performs learning after the normalized sentence learning unit 12 performs learning.

In the translation device 10 according to the present embodiment, for a plurality of pieces of learning data, a combination of original text for learning and a corresponding normalized sentence for learning is learned, and a combination of original text for learning and a corresponding translated sentence for learning is learned. Then, one normalization/translation model 70 is generated, which outputs the normalized sentence and the translated sentence of the second language from the input sentence of the first language on the basis of these learning results. In this manner, one common output model (the normalization/translation model 70) is generated based on the results of learning for normalization and translation, and thereby it is possible to shorten a period required for model generation (a total period required for learning and model generation) and to improve the output speed of the normalized sentence and the translated sentence, as compared to when each output model is generated individually. Furthermore, in the translation device 10 according to the present embodiment, translation learning is performed after normalization learning is performed first on at least a part of the learning data. As a result, for example, when learning is performed using an encoder/decoder model, on at least a part of the learning data, translated sentence learning can be performed with the influence of noise in the original text for learning suppressed using parameters learned in the normalization learning (that is, parameters suitable for normalization). This makes it possible to improve the translation accuracy in the normalization/translation model 70.

The normalized sentence learning unit 12 and the translated sentence learning unit 13 alternately perform learning with each other, and, on each piece of the learning data, the translated sentence learning unit 13 may perform learning continuously after the normalized sentence learning unit 12 performs learning. In this manner, the normalized sentence learning unit 12 and the translated sentence learning unit 13 alternately perform learning, and, on each piece of the learning data, the translated sentence learning unit 13 performs learning continuously after the normalized sentence learning unit 12 surely performs learning first, and thereby, for example, when learning is performed using the encoder/decoder model, it is possible to learn parameters suitable for both normalization and translation for each piece of the learning data. For example, when translation learning is performed on all pieces of the learning data after normalization learning is performed on all pieces of the learning data, it is not possible to learn the parameters suitable for both normalization and translation for each piece of the learning data (When translation learning is performed, parameters are learned with an influence of normalization learned earlier diminished). In this respect, as described above, the translated sentence learning unit 13 performs learning on each piece of the learning data continuously after the normalized sentence learning unit 12 performs learning thereon first, and thereby it is possible to appropriately learn parameters suitable for both normalization and translation. This makes it possible to further improve the translation accuracy.

The normalized sentence learning unit 12 and the translated sentence learning unit 13 may perform learning using an encoder/decoder model that uses a common encoder, and each decoder provided individually, and the translated sentence learning unit 13 may perform learning on each piece of the learning data by using the hidden state of the encoder learned by the normalized sentence learning unit 12. For each piece of the learning data, when learning by the normalized sentence learning unit 12 and learning by the translated sentence learning unit 13 are performed continuously, the encoder is provided in common, and the hidden state learned in normalized sentence learning is used in translated sentence learning, and thereby, it is possible to perform the translated sentence learning in which the influence of noise is suppressed (that is a grammatically correct conversion), and to further improve the translation accuracy.

The normalized sentence learning unit 12 and the translated sentence learning unit 13 may repeatedly perform learning a plurality of times on a plurality of pieces of learning data. By repeatedly performing learning, the parameters suitable for both normalization and translation can be learned more effectively, and the translation accuracy can be further improved.

The translation device 10 may further include the evaluation unit 15 that derives the loss function related to normalization and the loss function related to translation for the normalization/translation model 70 generated by the model generation unit 14, and evaluates the normalization/translation model 70 based on the value of each loss function, the evaluation unit 15 may evaluate that the normalization/translation model 70 is in a first state with low prediction accuracy when the normalized sentence learning unit 12 and the translated sentence learning unit 13 repeatedly perform learning on the plurality of pieces of learning data a plurality of times, and at least one of a value of the loss function related to normalization being larger than a predetermine first threshold value and a value of the loss function related to translation being larger than a predetermined second threshold value is satisfied, the normalized sentence learning unit 12 may repeatedly perform learning on each piece of the learning data independently, which is separate from the learning alternately performed by itself and the translated sentence learning unit 13 when the normalization/translation model is evaluated to be in the first state and the value of the loss function related to normalization is larger than the first threshold value, and the translated sentence learning unit 13 may repeatedly perform learning on each piece of the learning data independently, which is separate from the learning alternately performed by itself and the normalized sentence learning unit 12 when the normalization/translation model 70 is evaluated to be in the first state and the value of the loss function related to translation is larger than the second threshold value. In this manner, separately from normal learning (the normalized sentence learning and the translated sentence learning alternately performed with each other), intensive learning is performed individually on processing that is assumed to have a large value of the loss function and low prediction accuracy, and thereby the loss function can be effectively converged and the accuracy of the model can be improved. This makes it possible to further improve translation accuracy.

The translation device 10 further includes the acquisition unit 16 that acquires an input sentence of the first language and the translation unit 17 that has the normalization/translation model 70, the translation unit 17 may generate a normalized sentence by inputting the input sentence acquired by the acquisition unit 16 to the normalization/translation model 70, and may also generate a translated sentence of the second language corresponding to the normalized sentence by inputting the normalized sentence to the normalization/translation model 70. As a result, normalization and translation of a natural utterance (an input sentence) can be smoothly performed using one generated normalization/translation model 70, and translation can be performed with high speed and high accuracy.

Figure 10:
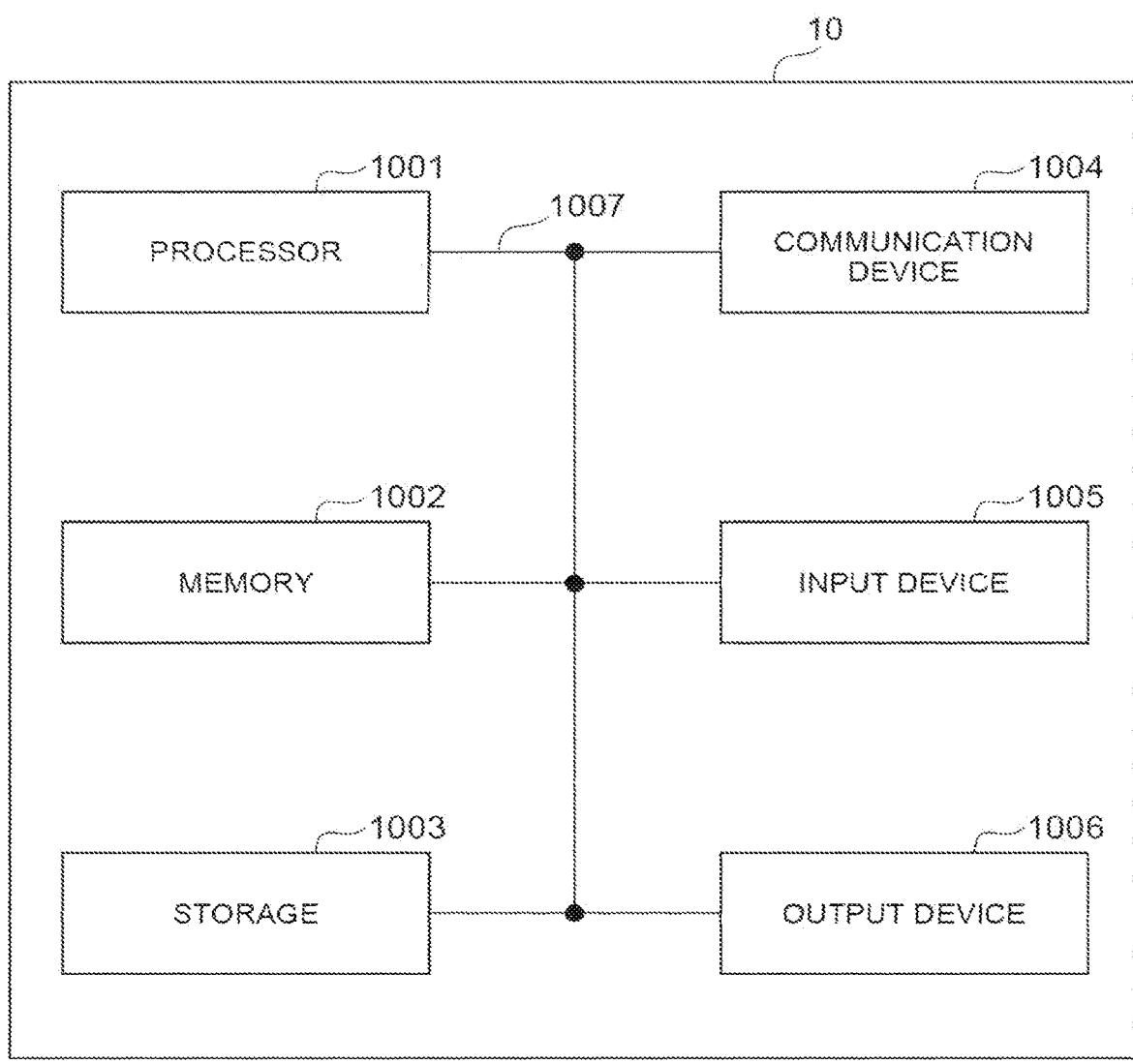
FIG. 10 is a diagram which shows a hardware configuration of the translation device shown in FIG. 1.

Finally, a hardware configuration of the translation device 10 will be described with reference to FIG. 10. The translation device 10 described above may be physically configured as a computer device including a processor 1001, a memory 1002, a storage 1003, a communication device 1004, an input device 1005, an output device 1006, a bus 1007, and the like.

In the following description, a word "device" can be read as a circuit, a device, a unit, or the like. The hardware configuration of the translation device 10 may be configured to include one or more of respective devices shown in FIG. 10, or may be configured not to include some of the devices.

Each function in the translation device 10 is realized by the processor 1001 performing an operation, and controlling communication by the communication device 1004 or reading and/or writing data in the memory 1002 and the storage 1003 by reading predetermined software (a program) on hardware such as the processor 1001 and the memory 1002.

The processor 1001 operates, for example, an operating system to control an entire computer. The processor 1001 may be configured by a central processing unit (CPU) including an interface with a peripheral device, a control device, an arithmetic operation unit, a register, and the like. For example, control functions of the normalized sentence learning unit 12 of the translation device 10 may be realized by the processor 1001.

In addition, the processor 1001 reads a program (a program code), software modules, and data from the storage 1003 and/or the communication device 1004 to the memory 1002, and executes various types of processing according to these. As the program, a program that causes a computer to execute at least a part of the operations described in the embodiment described above is used. For example, control functions of the normalized sentence learning unit 12 and the like of the translation device 10 may be realized by a control program stored in the memory 1002 and operated by the processor 1001, and may be similarly realized by other functional blocks. Although it has been described that the various types of processing described above are executed by one processor 1001, they may be executed simultaneously or sequentially by two or more processors 1001. The processor 1001 may be mounted on one or more chips. The program may be transmitted from a network via a telecommunication line.

The memory 1002 is a computer-readable recording medium, and may be configured from at least one of a read only memory (ROM), an erasable programmable ROM (EPROM), an electrically erasable programmable ROM (EEPROM), and a random access memory (RANI). The memory 1002 may be referred to as a register, a cache, a main memory (a main storage device), or the like. The memory 1002 can store a program (a program code), a software module, and the like that can be executed to implement a wireless communication method according to the embodiment of the present invention.

The storage 1003 is a computer readable recording medium, and may be configured from at least one of, for example, an optical disk such as a compact disc ROM (CD-ROM), a hard disk drive, a flexible disk, a photomagnetic disk (for example, a compact disk, a digital versatile disk, a Blu-ray (a registered trademark) disc), a smart card, a flash memory (for example, a card, a stick, or a key drive), a floppy (a registered trademark) disk, a magnetic strip, and the like. The storage 1003 may be referred to as an auxiliary storage device. The storage medium described above may be, for example, a data base containing the memory 1002 and/or the storage 1003, a server, or other appropriate media.

The communication device 1004 is hardware (a transmission/reception device) for performing communication between computers via a wired and/or wireless network, and is also referred to as, for example, a network device, a network controller, a network card, a communication module, or the like.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. The input device 1005 and the output device 1006 may have an integrated configuration (for example, a touch panel).

In addition, each device such as the processor 1001 or the memory 1002 is connected by the bus 1007 for communicating information. The bus 1007 may be configured from a single bus or may be configured from different buses between devices.

In addition, the translation device 10 may be configured to include hardware such as a microprocessor, a digital signal processor (DSP), an application specific integrated circuit (ASIC), a programmable logic device (PLD), and a field programmable gate array (FPGA), and some of all of each functional block may be realized by the hardware. For example, the processor 1001 may be mounted in at least one of these hardware components.

While the embodiments of the invention have been described above in detail, it is apparent to those skilled in the art that the invention is not limited to the embodiments described in this specification. The invention can be modified and altered in various forms without departing from the gist and scope of the invention defined by description in the appended claims. Accordingly, description in this specification is for exemplary explanation, and does not have any restrictive meaning for the invention.

The aspects/embodiments described in this specification may be applied to systems employing Long Tenn Evolution (LTE), LTE-Advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth®, or other appropriate systems and/or next-generation systems to which these systems are extended on the basis thereof.

The order of the processing sequences, the sequences, the flowcharts, and the like of the aspects/embodiments described above in this specification may be changed as long as it does not cause any inconsistencies. For example, in the methods described in this specification, various steps are described as elements in an exemplary order but the methods are not limited to the described order.

The input or output information or the like may be stored in a specific place (for example, a memory) or may be managed in a management table. The input or output information or the like may be overwritten, updated, or added. The output information or the like may be deleted. The input information or the like may be transmitted to another device.

Determination may be performed using a value (0 or 1) which is expressed in one bit, may be performed using a Boolean value (true or false), or may be performed by comparison of numerical values (for example, comparison with a predetermined value).

The aspects/embodiments described in this specification may be used alone, may be used in combination, or may be switched during implementation thereof. Notification of predetermined information (for example, notification of "X") is not limited to explicit notification, and may be performed by implicit notification (for example, the notification of predetermined information is not performed).

Regardless of whether it is called software, firmware, middleware, microcode, hardware description language, or another name, software can be widely interpreted to refer to commands, a command set, codes, code segments, program codes, a program, a sub program, a software module, an application, a software application, a software package, a routine, a sub routine, an object, an executable file, an execution thread, an order, a function, or the like.

Moreover, software, commands, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology are included in the definition of the transmission medium.

Information, signals, and the like described in this specification may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, a photo field or photons, or an arbitrary combination thereof.

Note that the terms described in this specification and/or the terms required for understanding this specification may be substituted by terms having the same or similar meanings.

In addition, information, parameters, and the like described in this specification may be expressed by absolute values, may be expressed by values relative to a predetermined value, or may be expressed by other corresponding information. For example, radio resources may be indicated by indices.

A user terminal may also be referred to as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or several appropriate terms by those skilled in the art.

The term "determining" or "determination" which is used in this specification may include various types of operations. The term "determining" or "determination" may include, for example, cases in which calculating, computing, processing, deriving, investigating, looking up (for example, looking up in a table, a database, or another data structure), and ascertaining are considered to be "determined." The term "determining" or "determination" may include cases in which receiving (for example, receiving information), transmitting (for example, transmitting information), input, output, and accessing (for example, accessing data in a memory) are considered to be "determined." The term "determining" or "determination" may include cases in which resolving, selecting, choosing, establishing, comparing, and the like are considered to be "determined." That is, the term "determining" or "determination" can include cases in which a certain operation is considered to be "determined."

The expression "on the basis of" as used in this specification does not mean "on the basis of only" unless otherwise described. In other words, the expression "on the basis of" means both "on the basis of only" and "on the basis of at least."

Any reference to elements having names such as "first" and "second" which are used in this specification does not generally limit amounts or an order of the elements. The terms can be conveniently used to distinguish two or more elements in this specification. Accordingly, reference to first and second elements does not mean that only two elements are employed or that the first element has to precede the second element in any form.

When the terms "include," "comprising," and modifications thereof are used in this specification or the appended claims, the terms are intended to have a comprehensive meaning similar to the term "comprising." The term "or" which is used in this specification or the claims is not intended to mean an exclusive logical sum.

In the present specification, it is assumed that multiple devices are included unless only one device is mentioned to be apparent in context or technically.

In the entirety of the present disclosure, a singular term includes plural forms unless the context clearly indicates otherwise.

REFERENCE SIGNS LIST

10 Translation device
11 Storage unit
12 Normalized sentence learning unit
13 Translated sentence learning unit
14 Model generation unit
15 Evaluation unit
16 Acquisition unit
17 Translation unit
18 Output unit
70 Normalization/Translation model

The invention claimed is:
1. A translation device comprising:
a memory configured to store a plurality of pieces of learning data in which original text for learning of a first language, a normalized sentence for learning that is a grammatically correct conversion of the original text for learning, and a translated sentence for learning that is a translation of the original text for learning into a second language different from the first language are associated with each other; and
processing circuitry configured to
perform normalized sentence learning on the plurality of pieces of learning data by combining the original text for learning and the normalized sentence for learning;
perform translated sentence learning on the plurality of pieces of learning data by combining the original text for learning and the translated sentence for learning; and
generate one normalization/translation model, which is configured to be able to output a normalized sentence of an input sentence of the first language and a translated sentence thereof into the second language on the basis of a result of the normalized sentence learning and the translated sentence learning,
wherein, on at least a part of the learning data, the translated sentence learning is performed after the normalized sentence learning, the normalized sentence learning and the translated sentence learning are alternately performed,
on each piece of the learning data, the translated sentence learning is performed continuously after the normalized sentence learning,
the normalized sentence learning and the translated sentence learning are repeatedly performed on the plurality of pieces of learning data a plurality of times, and
the processing circuitry is further configured to
derive a loss function related to normalization and a loss function related to the generated translation for a normalization/translation model, and evaluate the normalization/translation model based on a value of each loss function, and
evaluate that the normalization/translation model is in a first state with low prediction accuracy when the normalized sentence learning and the translated sentence learning are repeatedly performed on the plurality of pieces of learning data a plurality of times, and at least one of a value of the loss function related to normalization being larger than a predetermined first threshold value and a value of the loss function related to translation being larger than a predetermined second threshold value is satisfied,
wherein the normalized sentence learning is repeatedly performed on each piece of the learning data independently, which is separate from the learning alternately performed by the normalized sentence learning and the translated sentence learning when the normalization/translation model is evaluated to be in the first state and the value of the loss function related to normalization is larger than the first threshold value, and
the translated sentence learning is repeatedly performed on each piece of the learning data independently, which is separate from the learning alternately performed by the translated sentence learning and the normalized sentence learning when the normalization/translation model is evaluated to be in the first state and the value of the loss function related to translation is larger than the second threshold value.

2. The translation device according to claim 1,
wherein the normalized sentence learning unit and the translated sentence learning are performed using an encoder/decoder model using a common encoder and each decoder provided individually, and
the translated sentence learning is performed on each piece of the learning data using a hidden state of the encoder learned by the normalized sentence learning unit.

3. The translation device according to claim 1, wherein the processing circuitry is configured to:
acquire the input sentence of the first language; and
generate the normalized sentence by inputting the acquired input sentence to the normalization/translation model, and
generate a translated sentence of the second language corresponding to the normalized sentence by inputting the normalized sentence to the normalization/translation model.

4. A translation device comprising:
a memory configured to store a plurality of pieces of learning data in which original text for learning of a first language, a normalized sentence for learning that is a grammatically correct conversion of the original text for learning, and a translated sentence for learning that is a translation of the original text for learning into a second language different from the first language are associated with each other; and
processing circuitry configured to
perform normalized sentence learning on the plurality of pieces of learning data by combining the original text for learning and the normalized sentence for learning;
perform translated sentence learning on the plurality of pieces of learning data by combining the original text for learning and the translated sentence for learning; and
generate one normalization/translation model, which is configured to be able to output a normalized sentence of an input sentence of the first language and a translated sentence thereof into the second language on the basis of a result of the normalized sentence learning and the translated sentence learning,
wherein, on at least a part of the learning data, the translated sentence learning is performed after the normalized sentence learning,
wherein the normalized sentence learning and the translated sentence learning are performed using an encoder/decoder model using a common encoder and each decoder provided individually,
the translated sentence learning is performed on each piece of the learning data using a hidden state of the encoder learned by the normalized sentence learning,
the normalized sentence learning and the translated sentence learning are repeatedly performed on the plurality of pieces of learning data a plurality of times, and
the processing circuitry is further configured to
derive a loss function related to normalization and a loss function related to the generated translation for a normalization/translation model, and evaluate the normalization/translation model based on a value of each loss function, and
evaluate that the normalization/translation model is in a first state with low prediction accuracy when the normalized sentence learning and the translated sentence learning are repeatedly performed on the plurality of pieces of learning data a plurality of times, and at least one of a value of the loss function related to normalization being larger than a predetermined first threshold value and a value of the loss function related to translation being larger than a predetermined second threshold value is satisfied,
wherein the normalized sentence learning is repeatedly performed on each piece of the learning data independently, which is separate from the learning alternately performed by the normalized sentence learning and the translated sentence learning when the normalization/translation model is evaluated to be in the first state and the value of the loss function related to normalization is larger than the first threshold value, and
the translated sentence learning is repeatedly performed on each piece of the learning data independently, which is separate from the learning alternately performed by the translated sentence learning and the normalized sentence learning when the normalization/translation model is evaluated to be in the first state and the value of the loss function related to translation is larger than the second threshold value.

5. A method, implemented by processing circuitry of a translation device, comprising:
storing, at a memory, a plurality of pieces of learning data in which original text for learning of a first language, a normalized sentence for learning that is a grammatically correct conversion of the original text for learning, and a translated sentence for learning that is a translation of the original text for learning into a second language different from the first language are associated with each other;

performing normalized sentence learning on the plurality of pieces of learning data by combining the original text for learning and the normalized sentence for learning;

performing translated sentence learning on the plurality of pieces of learning data by combining the original text for learning and the translated sentence for learning; and generating one normalization/translation model, which is configured to be able to output a normalized sentence of an input sentence of the first language and a translated sentence thereof into the second language on the basis of a result of the normalized sentence learning and the translated sentence learning, wherein, on at least a part of the learning data, the translated sentence learning is performed after the normalized sentence learning, the normalized sentence learning and the translated sentence learning are alternately performed, on each piece of the learning data, the translated sentence learning is performed continuously after the normalized sentence learning, wherein the normalized sentence learning and the translated sentence learning are performed learning using an encoder/decoder model using a common encoder and each decoder provided individually, and the translated sentence learning is performed on each piece of the learning data using a hidden state of the encoder learned by the normalized sentence learning, the normalized sentence learning and the translated sentence learning are repeatedly performed on the plurality of pieces of learning data a plurality of times, and the method further includes deriving a loss function related to normalization and a loss function related to the generated translation for a normalization/translation model, and evaluate the normalization/translation model based on a value of each loss function, and evaluating that the normalization/translation model is in a first state with low prediction accuracy when the normalized sentence learning and the translated sentence learning are repeatedly performed on the plurality of pieces of learning data a plurality of times, and at least one of a value of the loss function related to normalization being larger than a predetermined first threshold value and a value of the loss function related to translation being larger than a predetermined second threshold value is satisfied, wherein the normalized sentence learning is repeatedly performed on each piece of the learning data independently, which is separate from the learning alternately performed by the normalized sentence learning and the translated sentence learning when the normalization/translation model is evaluated to be in the first state and the value of the loss function related to normalization is larger than the first threshold value, and the translated sentence learning is repeatedly performed on each piece of the learning data independently, which is separate from the learning alternately performed by the translated sentence learning and the normalized sentence learning when the normalization/translation model is evaluated to be in the first state and the value of the loss function related to translation is larger than the second threshold value.

* * * * *